United States Patent [19]
Picmaus et al.

[11] 3,917,993
[45] Nov. 4, 1975

[54] BISTABLE REGULATOR HAVING POSITIVE AND NEGATIVE FEEDBACK

[75] Inventors: Ernst Picmaus; Bernhard Bach, both of Frankenthal, Pfalz, Germany

[73] Assignee: Klein. Schanzlin & Becker Aktiengesellschaft, Germany

[22] Filed: Oct. 26, 1973

[21] Appl. No.: 410,224

[30] Foreign Application Priority Data
Oct. 31, 1972 Germany............................ 2253373

[52] U.S. Cl................ 323/75 N; 219/499; 219/505; 307/268; 307/310; 317/132; 330/104
[51] Int. Cl.²......................................... G05B 11/16
[58] Field of Search ............ 219/499, 505; 307/268, 307/290, 310; 317/132; 323/19, 40, 75 N, 100; 330/104

[56] References Cited
UNITED STATES PATENTS

| | | | |
|---|---|---|---|
| 3,225,216 | 12/1965 | Grabowski...................... | 330/104 X |
| 3,579,150 | 5/1971 | Badessa........................ | 330/104 X |
| 3,604,957 | 9/1971 | Satula.......................... | 307/310 |
| 3,777,187 | 12/1973 | Kohn............................ | 219/499 X |

*Primary Examiner*—A. D. Pellinen
*Attorney, Agent, or Firm*—Michael S. Striker

[57] ABSTRACT

A variable resistor having a resistance varying as a function of the characteristic to be controlled is connected in series with a resistor adjusted to the desired value of the characteristic, to form one arm of a bridge circuit whose other arms are fixed resistors. The common junction of two of the fixed resistors is directly connected to the direct input of an operational amplifier in whose output is connected to regulating element which regulates the characteristic to be controlled. A voltage divider is connected from the operational amplifier output to the inverting input. A capacitor is connected from one tap of the voltage divider to the direct input. The feedback circuit thus furnishes a negative feedback having a delay and a positive feedback having a differentiator characteristic, while the use of the bridge circuit allows use of an unsymmetrical power supply.

6 Claims, 1 Drawing Figure

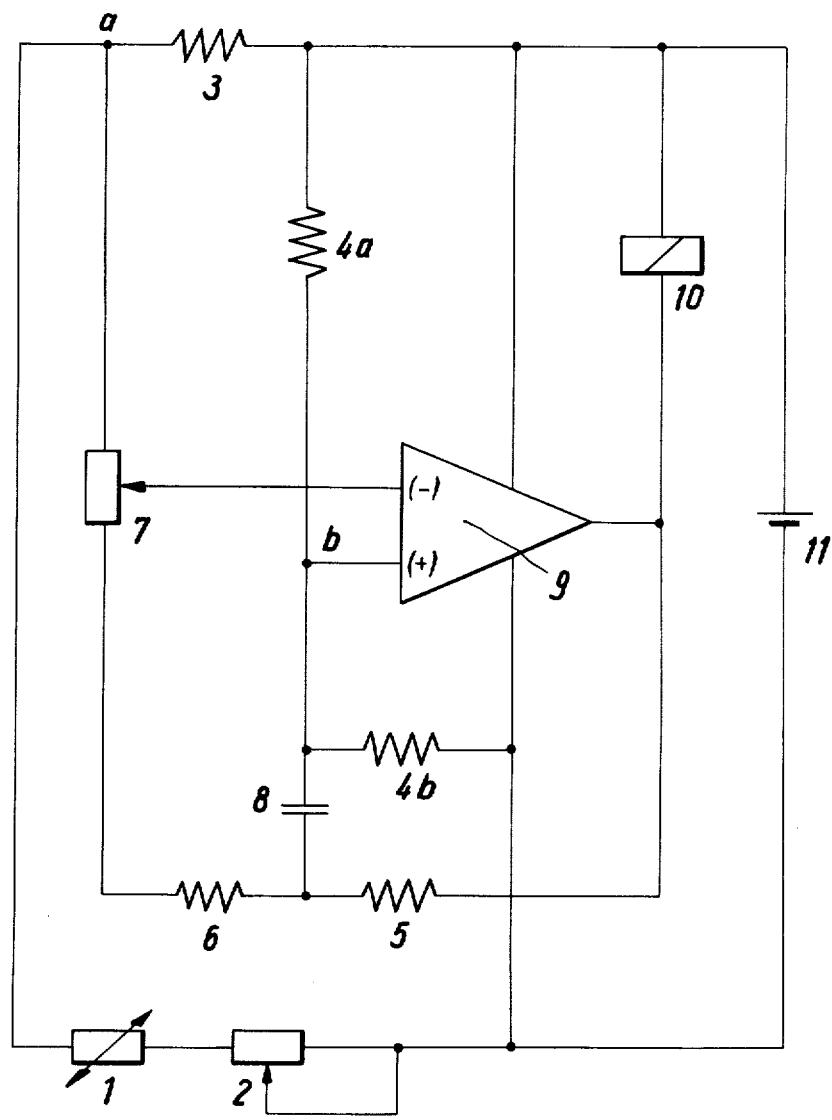

BISTABLE REGULATOR HAVING POSITIVE AND NEGATIVE FEEDBACK

BACKGROUND OF THE INVENTION

This invention relates to continuously operating two point electrical regulators having operational amplifiers. In particular it relates to such regulator systems wherein a negative feedback having a delay is combined with a positive feedback.

Electrical two point regulators using operational amplifiers are known which have a proportional-differential characteristic and which generate a discontinuous pulse width modulated control signal whose average value serves as a continuous control signal. This is accomplished for a discontinuous regulator by use of a delayed feedback whose feedback value opposes the error signal and thus causes an early equalization between the desired and the actual value of the quantity being controlled.

The reliable operation of the regulator element, without oscillation, and the switching in of the feedback circuit without causing unwanted transients in the circuit are particular problems of the above-mentioned regulator. Further problems encountered in this type of regulator are the centering of the operating point in the middle of the regulating region, the adjustment of the proportionally operating region without affecting other portions of the circuit, the design of the circuit such that it is not affected by variations in the characteristics of its various components and, finally, the possiblity of using an unsymmetrical power supply.

A number of solutions for these problems have been proposed, none of which are completely satisfactory.

For example, a system is known wherein the feedback is controlled by contacts which are mechanically coupled to the operation of the regulator element. However, changes in the resistance of these contacts have an adverse influence on the reliability of the circuit. Further, the operation of these contacts requires additional power which, for a compact unit, increases the thermal problems.

In another proposed solution (German Pat. No. 1,260,594) the feedback operates continuously to control a continuously operating pre-amplifier stage. This has the disadvantage that the continuous operation of the feedback causes changes in the characteristics of the bistable regulator and these characteristics are no longer directly related to the value of the control signal. In order to maintain the advantages of a two point regulator with pulse width modulation, the otherwise natural proportional-differential characteristic must be artificially constructed. However, the switching hysteresis of the bistable stage which follows is not compensated for in this system. A decreased system performance thus results.

It has further been suggested to use an additional amplified feedback in order to obviate the above disadvantages. However, the addition of further circuit elements creates a multiplicity of new problems.

In a further proposed solution, an operational amplifier is used in addition to a further positive feedback exceeding critical feedback. Because the positive feedback operates directly and continuously, this exerts a decisive influence on the negative feedback. Changes in the value of positive feedback result in changes in the switching hysteresis. This makes the setting of the regulating parameters more difficult. Further, the regulator reacts only to negative error signals. An increasing error results with increasing values of the quantity being regulated. Further, this particular type of regulating circuit requires a power supply which is balanced with respect to ground.

SUMMARY OF THE INVENTION

It is an object of the present invention to furnish a regulator which flips from one bistable state to the other without oscillations and which does not use mechanical contacts in the feedback path. It is a further object of the present invention that the operating point of the regulator be independent of the setting of the desired value and be substantially in the center of the regulating region.

The setting of the regulating parameters is to have no effect on the feedback circuit. Further, an unsymmetrical power supply, that is a power supply which furnishes a voltage of a given polarity with respect to ground only is to suffice.

The present invention comprises a two point regulating circuit which has an operational amplifier means. Further, feedback circuit means are connected to said operational amplifier means which furnish a delayed negative feedback and further furnish a positive feedback having a differentiator characteristic. This type of circuit assures a reliable switching from one bistable state to the other and prevents oscillations in the regulator element such as a relay which controls the particular parameter to be controlled by the system. Because of the differentiator characteristic of the positive feedback, the positive feedback is increased with increasing rate of change of the error signal and thus of the regulator signal, that is the signal at the output of operational amplifier 9. It further prevents interaction with the delayed negative feedback. Further, the percentage negative feedback decreases with the above-mentioned increases in the rate of change of the regulator signal.

In a preferred embodiment of the present invention, a capacitor is connected between a voltage divider which forms the negative feedback circuit and the direct input of the operational amplifier. Further, in the same preferred embodiment, the direct input of the operational amplifier is connected to the common point of two resistors which form one branch of a bridge circuit.

Thus in this particular regulating system the capacitor which forms part of the delay circuit in the negative feedback circuit is also used as a differentiating element in the positive feedback circuit. The bridge circuit which is required in any case for effecting the comparison between the desired and the actual value of the quantity to be controlled, that is for generating the error signal, is also used as a load resistance and to allow the use of an unsymmetrical power supply. The number of passive circuit elements required is thus no greater than that required for the bridge circuit and the negative feedback having a delay characteristic, in spite of the vastly improved operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE shows a schematic diagram of a preferred embodiment of the present invention.

DESCRIPTION OF THE PREFERRED EMBODIMENTS

A preferred embodiment of the present invention will now be described with reference to the drawing. The bridge circuit in the single FIGURE shows a first variable resistor 1 whose resistance varies as a function of the actual value of the parameter being controlled. In a preferred embodiment of the present invention this resistor is a negative temperature coefficient resistor having a resistance varying inversely as the temperature of an oven whose temperature is to be controlled in accordance with desired temperature settings.

Reference numeral 2 in the FIGURE refers to a second variable impedance, here also shown as a variable resistor, whose resistance is adjusted in accordance with the desired value of the parameter being controlled. The bridge circuit further comprises three fixed impedances, namely resistors 3,4a and 4b. The operational amplifier which constitutes a part of the two-point and bistable regulator of the present invention has reference numberal 9. A feedback circuit comprises a voltage divider having resistors 5 and 6 and a potentiometer 7 for setting the operating range (P region) as well as a capacitor 8 and the above-mentioned resistor 4b. Resistors 3 and 4a are herein referred to as the first and second fixed resistor, respectively. A regulator element 10, here a relay, is connected in the output circuit of operational amplifier 9. This serves to regulate the characteristic to be controlled.

The error signal, that is the voltage which varies as a function of the difference between the desired and actual value of the characteristic to be controlled appears between terminals a and b in the FIGURE. These terminals are herein referred to as the first and second balance terminals. Terminal a is connected via potentiometer 7 to the inverting input of the operational amplifier, while terminal b is connected to the direct input of operational amplifier 9. The so-derived error signal is amplified and is applied to the regulator element 10 which, in the preferred embodiment of the present invention, is a relay. A slow increase in the error signal can lead to oscillations in the signal applied to rely 10 and therefore to a chattering of the relay. It is thus necessary that the regulating system exhibits a bistable behavior. This characteristic is effected in accordance with the present invention by use of a feedback circuit which at first operates as a positive feedback.

The positive feedback in accordance with the present invention results from the fact that the terminal of capacitor 8 which is not connected to the common point of resistors 5 and 6 is connected to the direct input of operational amplifier 9 instead of being connected to a fixed potential. Further, the direct input of the operational amplifier is connected to terminal b which is one terminal of the bridge diagonal. Thus the potential at terminal b is affected by the charging current of capacitor 8.

The charging of capacitor 8 is controlled by the output voltage of operational amplifier 9, through resistor 5 and through resistors 4a or 4b. The charging current thus affects the voltage drop across bridge resistors 4a and 4b. This voltage drop is of the correct polarity to effect a positive feedback. Because of the action of capacitor 8 the positive feedback varies mainly in dependence on the rate of change of the output voltage of operational amplifier 9. High rates of change cause a great increase in positive feedback which causes a desirable early switching to the bistable state energizing relay 10. This early switching is also due to the fact that the negative feedback is delayed since the delay varies inversely with the positive feedback. Thus a decrease in the positive feedback is directly accompanied with an increase in the negative feedback.

The negative feedback is applied via resistors 5, 6 and 7 to the inverting input of the operational amplifier. The inverting input is indicated by a minus sign in the FIGURE. The negative feedback voltage appearing at terminal a after the delay determined by capacitor 8 and the associated resistors fixes the region of error signal (P region) in which the switching characteristic is present. Potentiometer 7 serves to set this region by furnishing a particular proportion of the negative feedback voltage. It should be noted that resistors 3 and 4a are herein referred to as the first and second fixed resistors, respectively, while resistor 4b is called the first resistor. The subtraction of the delayed negative feedback voltage from the error signal which takes place as a result of the above-described connections, causes unequal charging times, which in turn determine th on/off ratio.

It should be noted that the variable resistor 1 is connected in series with adjustable resistor 2. The regulating process thus causes not only the same bridge ratios to be maintained throughout, but also cause the same bridge impedance to be present at all times, independent of the particular value to which resistor 2 has been adjusted, that is independent of the desired value of the characteristic to be regulated.

The connection of the feedback circuit to the bridge diagonals a and b and the simultaneous use of the bridge circuit 1,2,3,4a and 4b for furnishing a symmetrical voltage from the unsymmetrical battery 11, causes each switching of the output voltage of operational amplifier 9 to result in a change in sign of the voltage across capacitor 8. The average value of charge thus, for equal on/off times, becomes zero. Thus the operating point of the regulating arrangement, in the absence of an error signal, lies in the center of the regulating region.

While the invention has been illustrated and described as embodied in specific positive and negative feedback circuits, it is not intended to be limited to the details shown, since various modifications and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A regulator circuit, comprising, in combination, operational amplifier means having a direct and an inverting input and an operational amplifier output; and feedback circuit means connected between said operational amplifier output and said inverting input for furnishing a delayed negative feedback and connected between said operational amplifier output and said direct input for furnishing a positive feedback, said feedback circuit means connected between said operational amplifier output and said direct input including a differentiator circuit; further comprising a power supply having a first and second voltage terminal; and wherein said feedback circuit means comprise a voltage divider having a first divider end terminal connected to said operational amplifier output, a second divider end terminal, and a first and second voltage divider tap, a variable impedance having an impedance varying as a function of the actual value of a quantity to be controlled connected between said second voltage terminal and said second terminal, means for connecting said second divider end terminal to said first voltage terminal, means for directly connecting said inverting input to said first voltage divider tap, a capacitor, means for interconnecting said capacitor between said second voltage divider tap and said direct input of said operational amplifier, and a resistor connected from said direct input to said second voltage terminal, whereby said capacitor and said resistor together constitute said differentiator circuit.

2. A regulator circuit, comprising, in combination, an operational amplifier having a direct and an inverting input and an operational amplifier output; a power supply having a first and second voltage terminal; and feedback circuit means connected between said operational amplifier output and said inverting input for furnishing a delayed negative feedback and connected between said operational amplifier output and said direct input for furnishing a positive feedback, said feedback circuit means connected between said operational amplifier output and said direct input including a differentiator circuit, said feedback circuit means comprising a voltage divider having a first divider end terminal connected to said operational amplifier output, a second divider end terminal, and a first and second voltage divider tap, means connecting said second divider end terminal to said first voltage terminal, means for directly connecting said inverting input to said first voltage divider tap, a capacitor, means for interconnecting said capacitor between said second voltage divider tap and said direct input of said operational amplifier, and a resistor connected from said direct input to said second voltage terminal, whereby said capacitor and said resistor together constitute said differentiator circuit; an adjustable impedance having an impedance corresponding to the desired value of a quantity to be controlled; a variable impedance having an impedance varying as a function of the actual value of said quantity to be controlled connected to said adjustable impedance thereby forming a series circuit; means for connecting said series circuit between said second voltage terminal and said second divider end terminal; a first fixed impedance connected between said second divider end terminal and said first voltage terminal; and a second fixed impedance connected between said first fixed impedance and said direct input of said operational amplifier, whereby said first and second fixed impedances, said resistor, and said variable and adjustable impedance together constitute a bridge circuit having a first balance terminal at said second divider end terminal and a second balance terminal directly connected to said direct input.

3. A regulator circuit, comprising, in combination, an operational amplifier having a direct and an inverting input and an operational amplifier output; a power supply having a first and second voltage terminal; and feedback circuit means connected between said operational amplifier output and said inverting input for furnishing a delayed negative feedback and connected between said operational amplifier output and said direct input for furnishing a positive feedback, said feedback circuit means connected between said operational amplifier output and said direct input including a differentiator circuit, said feedback circuit means comprising a voltage divider having a first divider end terminal connected to said operational amplifier output, a second divider end terminal, and a first and second voltage divider tap, means connecting said second divider end terminal to said first voltage terminal, means for directly connecting said inverting input to said first voltage divider tap, a capacitor; means for interconnecting said capacitor between said second voltage divider tap and said direct input of said operational amplifier, and a resistor connected from said direct input to said second voltage terminal, whereby said capacitor and said resistor together constitute said differentiator circuit; an adjustable impedance having an impedance corresponding to the desired value of a quantity to be controlled connected to said second voltage terminal; a variable impedance having an impedance varying as a function of the actual value of said quantity to be controlled connected to said adjustable impedance and to said second divider end terminal; a first fixed impedance connected between said variable impedance and said first voltage terminal; and a second fixed impedance connected between said first fixed impedance and said direct input of said operational amplifier, whereby said first and second fixed impedances, said resistor, and said variable and adjustable impedance together constitute a bridge circuit having a first balance terminal at the common point of said first fixed impedance and said variable impedance and a second balance terminal directly connected to said direct input.

4. A regulator as set forth in claim 3, wherein said adjustable impedance is an adjustable resistor, and wherein said variable impedance is a variable resistor connected in series to said adjustable resistor.

5. A regulator as set forth in claim 4, wherein said first and second fixed impedances are, respectively, a first and second fixed resistor.

6. A regulator as set forth in claim 3, wherein said voltage divider comprises a potentiometer having a wiper, said wiper constituting said first voltage divider tap.

* * * * *